July 12, 1927.  1,635,614
E. GERLING
METHOD OF MANUFACTURING THE KNIVES OF RAZORS
Filed July 30, 1926
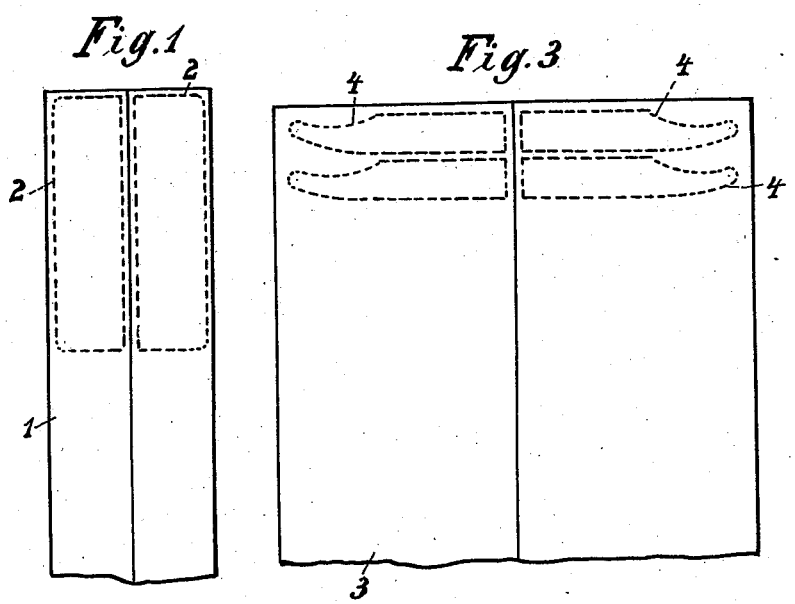
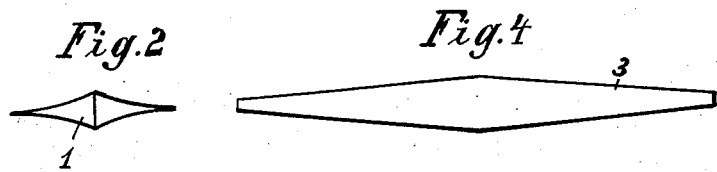
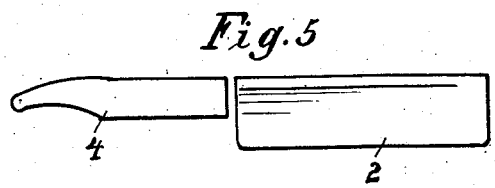
Inventor:
Ernst Gerling
by Langner, Parry, Card & Langner
Attys.

Patented July 12, 1927.

1,635,614

UNITED STATES PATENT OFFICE.

ERNST GERLING, OF OHLIGS-SOLINGEN, GERMANY.

METHOD OF MANUFACTURING THE KNIVES OF RAZORS.

Application filed July 30, 1926, Serial No. 126,025, and in Germany September 5, 1925.

The invention refers to the art of manufacturing razors, and its object is, to render the manufacture of razor knives more economic by the introduction of modern labour saving and material saving manufacturing methods, allowing at the same time, to turn out manufactured goods of most superior quality at a reduced price.

The metallic part or knife of razors, which consists of the blade and of the stem, and which is fastened in the sheath or handle, is manufactured up to the present time as a rule by manual labour. On the other side it has been proposed already, to replace the manual labour by mechanical work, through the application of a manufacturing method, in which the whole razor knife is cut out of a continuous steel ribbon, which is shaped by passing it through correspondingly formed rollers.

The new and improved method of manufacturing the knives of razors, which is the subject of my present invention, consists in manufacturing separately the blades proper out of a continuous steel ribbon, and in manufacturing the stems of the blades out of another steel or metallic ribbon and in uniting thereupon the blades with the stems in any suitable manner, for instance by a welding or riveting process. If the blades and the stems would be cut out alternatingly out of the same steel ribbon, then this ribbon would have to be rolled correspondingly in sections, so as to produce lengths, which are shaped to the form of the blade or to the form of the stem alternatingly. But such manufacturing method involves considerable losses of material, as the stems are much smaller than the blades. My new and improved manufacturing method avoids those considerable losses.

Another essential point of my invention is the particular shape of the steel ribbons to be used in the manufacturing process. The steel ribbon for the blades may be chosen of such shape, that the blades are arranged in it following each other lengthwise. Such arrangement results in a steel ribbon of a conical or triangular cross section, the sides of which are preferably hollow curved, to bring the blades to the shape, which is needed in the practical use of the razor. In a similar way for the stems a steel ribbon may be chosen, in which the stems are arranged side by side crosswise to the length of the ribbon, and likewise this ribbon is further made of slightly conical cross section, so that the single stems which are cut out of it, are slightly conical, in conformity with the conditions in the finished razor knife. In carrying out my invention it is further an important feature, that the used two continuous steel ribbons are of such shape, that the blades and likewise so the stems are always cut out in pairs, which requires, the two ribbons to have double conical cross sections. Finally a most important feature of my invention consists therein, that it allows the stems to be manufactured out of a cheaper material, than the blades, which means another reduction of the costs of the manufactured goods.

In the drawings I have illustrated my invention with reference to its preferred embodiment, whereby the Figs. 1 and 2 are the plan and the cross-section of the ribbon, out of which the blades are cut;

Figs. 3 and 4 are the plan and the cross-section of the ribbon, out of which the stems are cut; and Fig. 5 is the plan of a blade and of a stem, before they are united, to form the knife of a razor.

In the Figs. 1 and 2 the steel ribbon 1 for forming the blades is rolled, so as to be thickest in its medium part or longitudinal axis, and to taper off in the direction to the two lateral rims, the slanting faces on both sides being preferably concaved, so as to facilitate the formation of the blades 2. The Figures 3 and 4 show the ribbon 3 for forming the stems 4, this ribbon being likewise thickest in its medium part or longitudinal axis, and slanting to both sides, so as to produce a cross-section of the ribbon, which is conical from its middle axis towards both rims. This double sided conical cross section of the steel ribbon has the result, that each single shaft 4, after being united with its blade proper 2, tapers in the direction from the part fastened to the blade towards the curved end at the handle, without any forging or other special working on it being necessary to this effect. In a less perfect embodiment of the manufacturing process steel ribbons may be used, which have not double conical cross section, but simple one sided conical cross section, such as it would be obtained, if the ribbons, shown in the Figs. 1 and 2, respectively in the Figs. 3 and 4, were cut in their middle longitudinal axis and only the right half or the left half of them would be used.

The blades and the stems are put together, as the Figure 5 shows it, and they are then united by welding or riveting or by any other suitable process. The cross sections of the metallic ribbons 1 and 3 can be chosen so that nearly no loss at all of the valuable material takes place; and further considerable economies in the manufacture can be made by using the most expensive quality brand steel only for the ribbon 1, from which the blades are made, whilst the ribbon 3 for the stems may be made out of less valuable material.

I claim:

1. A method of manufacturing razor knives, consisting in: manufacturing the blades proper separately out of a continuous steel ribbon of conical or triangular cross section with double concave sides, in which the blades are arranged lengthwise the one after the other; and manufacturing the metallic stems of the blades out of another continuous metallic ribbon; and uniting the stems with the blades.

2. A method of manufacturing razor knives, consisting in: manufacturing the blades proper separately out of a continuous steel ribbon; and manufacturing the metallic stems of the blades out of another continuous metallic ribbon of conical cross section, in which the stems are arranged side by side crosswise to the length of the ribbon; and uniting the stems with the blades.

3. A method of manufacturing razor knives, consisting in: manufacturing the blades proper separately out of a continuous steel ribbon of double conical cross section with concave planes extending from the middle longitudinal axis towards both rims of the ribbon, and with pairs of blades following lengthwise the one pair after the other pair in the ribbon; and manufacturing the metallic stems of the blades separately out of another metallic or steel ribbon of likewise double conical cross section, which slants from the middle longitudinal axis to both rims of the ribbon, whereby pairs of stems with a head-to-head arrangement of the single conical stems follow in a side-by-side arrangement along the length of the ribbon; and uniting the stems with the blades.

4. A method of manufacturing razor knives, consisting in: manufacturing the blades proper separately out of a continuous, higher quality steel ribbon of double conical cross-section with concave planes extending from the middle longitudinal axis towards both rims of the ribbon, and with pairs of blades, following one pair after the other pair lengthwise in the ribbon; and manufacturing the metallic stems of the blades separately out of another continuous, less valuable metallic ribbon of likewise double conical cross section, which slants from the middle longitudinal axis towards both rims of the ribbon, whereby pairs of stems with a head-to-head arrangement of the single conical stems follow each other in a side-by-side arrangement along the length of the ribbon; and uniting the stems with the blades.

In testimony whereof I have affixed my signature.

ERNST GERLING.